United States Patent
Franko-Filipasic

[11] 4,040,843
[45] Aug. 9, 1977

[54] FLAME-RETARDANT REGENERATED CELLULOSE FILAMENTS CONTAINING OLIGOMERIC PHOSPHONITRILIC COMPOUNDS

[75] Inventors: Borivoj Richard Franko-Filipasic, Morrisville, Pa.; John Francis Start, Mercerville, N.J.

[73] Assignee: FMC Corporation, Philadelphia, Pa.

[21] Appl. No.: 656,681

[22] Filed: Feb. 9, 1976

Related U.S. Application Data

[60] Continuation-in-part of Ser. No. 428,111, Dec. 26, 1973, abandoned, which is a division of Ser. No. 230,955, March 1, 1972, Pat. No. 3,836,599.

[51] Int. Cl.$^2$ .......................... C08L 1/08; C08L 1/24; D01F 2/08; D06M 13/32; D06M 13/44
[52] U.S. Cl. ................................ 106/15 FP; 106/165; 106/168; 106/177; 264/194; 428/920
[58] Field of Search .................... 106/15 FP, 165, 168, 106/177; 252/8.1; 428/920; 264/194

[56] References Cited

U.S. PATENT DOCUMENTS

| | | | |
|---|---|---|---|
| 3,455,713 | 7/1969 | Godfrey | 106/165 |
| 3,836,599 | 9/1974 | Franko-Filipasic et al. | 106/15 FP |

FOREIGN PATENT DOCUMENTS

| | | | |
|---|---|---|---|
| 933,720 | 8/1963 | United Kingdom | 106/15 FP |

*Primary Examiner*—J.C. Cannon

[57] ABSTRACT

Regenerated cellulose filaments containing a flame-retardant amount of liquid oligomeric compounds, prepared by heating together liquid polyphosphonitrilic esters with phosphoric anhydride, and method for preparing same.

9 Claims, No Drawings

FLAME-RETARDANT REGENERATED CELLULOSE FILAMENTS CONTAINING OLIGOMERIC PHOSPHONITRILIC COMPOUNDS

This is a continuation-in-part of application Ser. No. 428,111, filed Dec. 26, 1973, and now abandoned, which is a division of application Ser. No. 230,955, filed Mar. 1, 1972, now U.S. Pat. No. 3,836,599.

This invention relates to regenerated cellulose filaments containing viscous oligomeric flame-retardant fluids prepared by heating together liquid phosphonitrilic esters with phosphoric anhydride.

It is desirable, for many textile purposes, to provide cellulose fibers and yarns having greatly decreased flammability. In the manufacture of rayon by the viscose method, rayon has been made permanently flame-retardant by dispersing in the rayon a flame-retardant amount of a substantially water-insoluble, liquid, phosphonitrilate polymer as disclosed by Godfrey in U.S. Pat. Nos. 3,455,713, 3,505,087 and 3,532,526 issued July 15, 1969, Apr. 7, 1970, and Oct. 6, 1970, respectively. These phosphonitrilate polymers are conventionally made by esterifying a predominately trimeric chlorophosphazene (phosphonitrilic chloride polymer). The chlorophosphazene can be made by bringing into contact elemental chlorine, phosphorus trichloride and ammonium chloride in an inert solvent at reflux temperatures as described in U.S. Pat. Nos. 3,359,080 and 3,462,247 issued Dec. 19, 1967 and Aug. 19, 1969, respectively.

Although the Godfrey compositions do not seriously degrade rayon fiber properties, it is always desirable to have more effective flame retardants allowing attainment of adequate flame retardance at a lower additive level with a consequent lowered impairment of physical properties of the rayon fibers and a decrease in cost. Recently, it has been discovered that phosphonitrilates of increased viscosity are improved flame retardants for rayon. Thus, it is highly desirable to provide processes for making high viscosity phosphonitrilates having enhanced flame-retardant effects in rayon.

In accordance with the present invention, regenerated cellulose filaments and filamentary articles have dispersed therein a flame-retardant amount of a substantially water-insoluble viscous phosphorus-containing oligomeric flame-retardant fluid made by heating together fluid phosphonitrilic esters and phosphoric anhydride, in a ratio of about ten to twenty moles of the ester (based on a monomeric unit of the ester general formula) to one mole of the anhydride (phosphorus pentoxide). The flame-retardant materials are used to flame retard rayon in amounts of 1 to 25% by weight based on the rayon.

The phosphonitrilic esters are represented by the general formula:

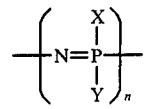

in which general formula $n$ is at least 3 and X and Y represent the same or different substituents including —OR groups wherein R is aliphatic, being straight or branch chained and having 1 to 12 carbon atoms; preferably R is an alkyl or alkenyl radical having from 2 to 6 carbon atoms. R may also have substituent groups including halogens, ether or amino groups. Some of the X and Y substituents can remain halogens from the phosphonitrilic halide polymer from which the ester was derived; usually, the halogen is chlorine.

The phosphonitrilic esters (phosphonitrilates) used as reactants in this invention are prepared by first making phosphonitrilic chloride polymers in a conventional process by bringing into contact elemental chlorine, phosphorus trichloride and ammonium chloride in an inert solvent at reflux temperature, the ammonium chloride being present at any time during the reaction in a proportion at least equal molar with the phosphorus trichloride. Where phosphonitrilic chloride polymers which are greatly increased in viscosity are desired, it is possible to prepare such viscous oligomeric phosphonitrilic chloride polymers by having a very high proportion of phosphorus pentachloride in the reaction mixture.

The phosphonitrilate polymer used in this invention is a cyclic trimer, tetramer or higher cyclic polymer, or a linear polymer and is preferably employed as a mixture of these isomers based on economy and similar performance to the pure compound. In any event the phosphonitrilic chloride polymers are esterified by methods well known in the art, such as by reaction of the chloride with an alcohol in the presence of a tertiary amine or with a sodium alkoxide or an alkylene oxide.

The alkyl portion of the reactant in the esterification reaction can be lower alkyl and alkylene radicals containing 1 to 6 carbon atoms such as methyl, ethyl, 2-chloroethyl, n-propyl, isopropyl, n-butyl, isobutyl, amyl, isoamyl, hexyl, allyl and crotyl radicals. It is preferred that the alkyl radical be a propyl radical or that if a mixture of alkyl radicals is preferred, the mixture should average about 3 carbon atoms. In any event, it is most important that the reactant be free of active hydrogen that could influence the course of the subsequent reaction of the ester with phosphoric anhydride ($P_2O_5$).

Phosphoric anhydride is reacted with the phosphonitrilic ester at a temperature of about 50° to about 180° C for a period of at least 2 hours. The preferred reaction conditions are 2 to 12 hours at 100° to 150° C. Longer reaction periods such as 24–36 hours may be used if this is convenient. Diluents can be added to the reaction mass; but since the phosphoric anhydride will dissolve the liquid phosphonitrilic ester during the reaction, a solvent is not required.

The following examples further illustrate this invention. All proportions in the example and throughout the specification are by weight unless otherwise stated.

EXAMPLE 1

A mixture of 830 gms (5.08 gm moles based on the ester monomeric unit = 163.2 gm) of n-propyl phosphonitrilic esters prepared in the usual way and containing about 65% trimer, 15% tetramer, 15 to 20% higher cyclic polymers and less than 5% linear polymers, and 61.5 gms (0.43 gm mole) of phosphorus pentoxide were stirred in a nitrogen atmosphere at 146° C for six hours. The ester: anhydride mole ratio was therefore 11.7 to 1. The phosphorus pentoxide dissolved within the first hour of heating. The crude reaction mixture was washed with 330 ml of a 10% aqueous solution of $NaHCO_3$ at 65°. The mixture separated readily. There was obtained, after vacuum stripping of the product at 80°, 1 torr. 831.4 gms of a clear viscous fluid of the following physical properties:

| | |
|---|---|
| Average molecular weight | 849 (625 initially) |
| Viscosity (centistokes at 25°) | 1100 (52 initially) |
| Refractive index at 24° | 1.4639 (1.4574 initially) |

EXAMPLE 2

The phosphorus-containing product of Example 1 and a flame-retardant compound described in the Example of the Godfrey U.S. Pat. No. 3,455,713 were evaluated for their flame-retardant effect in rayon yarn produced from a filament-forming viscose comprising 8.6 wt. % cellulose, 6.2 wt. % sodium hydroxide and 33.0% carbon disulfide, based on the weight of the cellulose, and having a viscosity at spinning of 6000 centipoises at 18° C. The phosphorus-containing flame-retardant compounds were injected into the viscose stream at the desired rate based on the weight of the cellulose in the viscose and the viscose mixture passed through a high shear blender. This provided a viscose having the flame retardant dispersed therein as fine liquid particles of from 1 to 10 microns in size.

Viscoses prepared as described above and containing deliberately varied amounts of the phosphorus-containing flame-retardant compounds were spun into conventional aqueous acid spin baths comprising 9.8 wt. % sulfuric acid, 3.0 wt. % zinc sulfate and 17.5 wt. % sodium sulfate at a bath temperature of 50° C. The yarn was wet stretched about 35% of its original length. Yarns having a denier of 240 and 40 filaments were processed by passing them through a series of baths including water wash, desulfurization, bleach, bleach acid, antichlor, and soft finish bath. The yarns were dried, transferred to packages, and finally knit into circular knit fabrics. The regenerated cellulose yarns prepared in this manner were made up of individual filaments having fine liquid flame-retardant particles locked in the cellulose matrix.

Assays of the flame retardant in the fabrics were made by determining the phosphorus content of the neat flame retardants and the fabrics.

Table I sets forth the weight percentage amount of flame retardant in the conditioned fabric, and the weight percentage amount of phosphorus in the dry regenerated cellulose fabric. The amount of phosphorus in the dry fabric was used to calculate the percentage amount of flame retardant present in the conditioned fabric. The control flame retardant was that described in the Example of U.S. Pat. No. 3,455,713 and consisted of a liquid mixture of di-n-propyl-phosphonitrilate polymers including about 65% trimer, 15% tetramer, between about 15 and 20% of higher cyclic polymers and less than about 5% of linear polymers.

Flammability testing was made by employing the (1) Limited Oxygen Index (LOI) method and (2) the Vertical Strip Test AATCC34-1969.

The LOI test is made by supporting a 3×8 inch conditioned fabric sample in a U-shaped frame which is mounted in a cylindrical open chamber. Controlled mixtures of oxygen and nitrogen gases are admitted into the base of the chamber and allowed to displace the normal atmosphere. When an equilibrium atmosphere in the chamber is obtained, the fabric sample is ignited with a butane gas flame by contacting the flame to the top edge of the fabric. If the fabric fails to ignite, the oxygen ratio of the atmosphere is increased to a level where the flame will just propagate. Conversely, if the fabric ignites and the flame propagates, the oxygen ratio of the atmosphere is reduced to a level where flame propagation is virtually zero. The LOI is the minimum percentage concentration of the oxygen atmosphere in which the test fabric will ignite and permit flame propagation. A control rayon fabric has an LOI of 18.5.

The vertical strip test is made by supporting a 3 by 10 inch fabric sample in a U-shaped frame which exposes 2 by 10 inch fabric. The sample and frame is supported vertically in a draft-free chamber with the open end of the fabric frame pointed down. Ignition of the fabric is made with a Tirrell Burner fueled with butane. A 1½ inch long flame is aligned to the base of the fabric so that ¾ inch of the flame bites into the fabric. Flame contact time is for (a) 3 seconds and (b) 12 seconds. Data are obtained to show the length of the char and the time of after flame.

Table I sets forth the results of the above described flammability tests carried out on the fabric samples. It should be borne in mind that the tests were made using knitted fabrics of relatively light construction. The vertical frame-retardant test results are useful for a relative appraisal of the fabrics tested as this test is greatly affected by fabric weight. In the vertical test, five samples are tested; the average char length must be less than 7 inches to pass and one char of 10 inches fails the test.

The limited oxygen test data have greater relevance to the flammability of normal apparel weight fabrics since the limited oxygen indices are not dependent on fabric weight.

TABLE I

| Flame Retardant, (FR) | Fabric Sample No. | % FR in Conditioned Fabric | % P | Limited Oxygen Index Test | Vertical Flame Test | | | |
|---|---|---|---|---|---|---|---|---|
| | | | | | 3 Sec. | | 12 Sec. | |
| | | | | | Char Length In.* | After Flame Sec. | Char Length In. | After Flame Sec. |
| Example 1 | 1 | 6.3 | 1.41 | 25.3 | 10.0 F | 13.6 | 10.0 F | 4.0 |
| | 2 | 8.3 | 1.83 | 25.3 | 10.0 F | 15.4 | 7.9 F | 2 to NAF** |
| | 3 | 10.5 | 2.34 | 25.7 | 9.0 F | 13.5 | 5.3 | NAF |
| Control | 1 | 5.0 | 0.98 | 23.8 | 10.0 | 18.0 | 10.0 | 7.0 |
| | 2 | 9.9 | 2.11 | 25.7 | 10.0 | 17.0 | 9.0 | NAF–5.0 |
| | 3 | 11.0 | 2.30 | 24.7 | 10.0 | 17.2 | 9.0 | NAF–7.7 |
| | 4 | 14.1 | 2.90 | 25.3 | 9.0 | 13.0 | 5.6 | NAF |
| | 5 | 16.9 | 3.50 | 26.0 | 3.0 | NAF–4.5 | 5.2 | NAF |
| | 6 | 21.0 | 4.30 | 26.3 | 1.9 | NAF | 5.2 | NAF |

\* - Over 7 inches fails in the three second test.
\*\* - NO AFTER FLAME.
F - Failed.

What is claimed is:

1. Regenerated cellulose filaments and filamentary articles, said filaments having dispersed therein a flame-retardant amount of a substantially water-insoluble viscous phosphorus-containing oligomeric flame-retardant fluid made by heating together at a temperature of about 50 to 180° C for at least 2 hours up to 36 hours (a) phosphoric anhydride with (b) a fluid phosphonitrilic ester having the general formula:

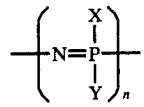

in which $n$ is at least 3 and wherein X and Y represent the same or different —OR groups wherein R is an alkyl or alkenyl radical having 1 to 12 carbon atoms, at a mole ratio of 1 mole of (a) to 10 to 20 moles of (b), wherein moles of (b) are based on a monomeric unit of the ester general formula.

2. The product of claim 1 in which R has substituent chlorine atoms.

3. The product of claim 1 containing 1 to 25 % of the viscous oligomeric flame retardant, based on the weight of the cellulose.

4. The product of claim 1 wherein R is selected from the group consisting of methyl, ethyl, chloroethyl, propyl, isopropyl, butyl, isobutyl, amyl, isoamyl, hexyl, allyl and crotyl radicals.

5. The method of preparing flame-retardant regenerated cellulose filaments which combines mixing viscose and a flame-retardant amount of a substantially water-insoluble viscous phosphorus-containing oligomeric flame-retardant fluid made by heating together at a temperature of about 50° to 180° C for at least 2 hours up to 36 hours (a) phosphoric anhydride with (b) a fluid phosphonitrilic ester having the general formula:

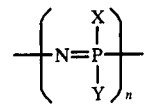

in which $n$ is at least 3 and wherein X and Y represent the same or different —OR groups wherein R is an alkyl or alkenyl radical having 1 to 12 carbon atoms, at a mole ratio of 1 mole of (a) to 10 to 20 moles of (b), wherein moles of (b) are based on a monomeric unit of the ester general formula, and, thereafter, spinning the mixture into filaments.

6. The method of claim 5 in which R has substituent chlorine atoms.

7. The method of claim 5 wherein the regenerated cellulose filament contains 1 to 25% of the liquid polymeric phosphazene, based on the weight of the cellulose.

8. The method of claim 5 wherein R is selected from the group consisting of methyl, ethyl, chloroethyl, propyl, isopropyl, butyl, isobutyl, amyl, isoamyl, hexyl, allyl and crotyl radicals.

9. The method of claim 5 in which the R radicals are different and one of the radicals is halogenated.

* * * * *